United States Patent
Peng et al.

(10) Patent No.: US 8,259,862 B2
(45) Date of Patent: Sep. 4, 2012

(54) RECEIVERS AND SYMBOL DECODERS THEREOF

(75) Inventors: Wei-Chung Peng, Hsinchu (TW); Jeng-Hong Chen, Hsinchu (TW); Pansop Kim, Hsinchu (TW)

(73) Assignee: ISSC Technologies Corp., Hsinchu (TW)

( * ) Notice: Subject to any disclaimer, the term of this patent is extended or adjusted under 35 U.S.C. 154(b) by 473 days.

(21) Appl. No.: 12/637,388

(22) Filed: Dec. 14, 2009

(65) Prior Publication Data
US 2011/0142173 A1  Jun. 16, 2011

(51) Int. Cl.
*H04L 27/14* (2006.01)
(52) U.S. Cl. .................................................. 375/334
(58) Field of Classification Search .................. 375/268, 375/269, 271, 272, 316, 322, 323, 324, 334; 329/300
See application file for complete search history.

(56) References Cited

U.S. PATENT DOCUMENTS

| | | | |
|---|---|---|---|
| 6,603,824 B1 * | 8/2003 | Cinkler et al. | 375/340 |
| 2003/0043947 A1 * | 3/2003 | Zehavi et al. | 375/365 |
| 2004/0013209 A1 * | 1/2004 | Zehavi et al. | 375/334 |
| 2006/0116091 A1 * | 6/2006 | Hammes et al. | 455/132 |

* cited by examiner

*Primary Examiner* — Lawrence B Williams
(74) *Attorney, Agent, or Firm* — Alston & Bird LLP

(57) ABSTRACT

A receiver capable of decoding a symbol based on information on a previous symbol, the symbol and a next symbol in a Gaussian frequency shift keying (GFSK) communication system is provided. The receiver includes a discriminator to generate a symbol for each bit in a bit sequence, a first lookup table (LUT) to store a number of bit patterns and mapping patterns, wherein each of the bit patterns is in the form of a set of consecutive bits in the bit sequence and corresponds to a respective one of the mapping patterns, and wherein each of the mapping patterns includes a set of entries and each of the entries results from an operation of attribute values at a sample time in the waveform of a symbol, a calculator to receive a set of consecutive symbols from the discriminator and calculate a distance value between the set of consecutive symbols and each of the mapping patterns, and a comparator to identify one of the mapping patterns with a minimum distance value by comparing among the distance values from the calculator.

19 Claims, 10 Drawing Sheets

RECEIVERS AND SYMBOL DECODERS THEREOF

BACKGROUND OF THE INVENTION

The present invention generally relates to receivers in a communication system. More particularly, the present invention relates to receivers capable of symbol decoding based on the information on previous, current and next symbols in a wireless communication system.

In wireless communication systems, inter-symbol-interference (ISI) may result from multipath propagation and/or filtering. Transmitter filtering may generally be required to reduce or minimize out-of-band spurious emission. Moreover, receiver filtering may be required to eliminate adjacent band interference and receiver noise. Since multipath propagation is common in wireless channels, the ISI effect needs to be mitigated at the receiver.

Generally, a bitwise decoder may decode one symbol at a time while ignoring the ISI effect. A decision-feedback (DF) decoder may decode a current symbol at symbol rate by using the decision of a previous symbol (or previous symbols) to estimate and remove the interference from the previous symbol(s), while a maximum-likelihood (ML) decoder may optimally find the most-likely stream of decoded bits.

For a Gaussian Frequency Shift Keying (GFSK) signal, discriminator-based GFSK receivers were described in "Bluetooth Demodulation Algorithms and Their Performance" by R. Schiphorst, et. al. and "A 2.4-GHz CMOS Transceiver for Bluetooth" by H. Darabi, et. al. However, these simple bitwise discriminator-based receivers may not achieve desirable performance. In "Performance of the Bluetooth System in Fading Dispersive Channels and Interference" by A. Soltanian, et. al. (Hereinafter "Soltanian"), an (near) ML decoder was disclosed to take into consideration the effect of ISI caused by a Gaussian filter in a transmitter, which may enhance the sensitivity performance of a receiver against a bitwise decoder. However, the near ML decoder may be too complicated to be implemented in hand-held devices such as Bluetooth headsets. "Noncoherent Sequence Detection Receiver for Bluetooth Systems" by L. Lampe, R. Schober, and M. Jain disclosed another near ML decoder using Laurent decomposition proposed in "Exact and Approximate Construction of Digital Phase Modulations by Superposition of Amplitude Modulated Pulses (AMP)" by P. Laurent (hereinafter "Laurent") and a Viterbi decoder to find the most-likely stream of decoded bits. However, the performance of such a near ML decoder may be sensitive to uncertain parameters such as phase, frequency offset and/or modulation index h.

Furthermore, in "Performance of Sequence Estimation Scheme of Narrowband Digital FM Signals with Limiter-Discriminator Detection" by Y. Iwanami, sub-optimal DF and/or ML receivers with discriminator outputs were explained for digital FM signals assuming noise at the discriminator outputs is additive zero-mean independent identically distributed (i.i.d.) Gaussian noise. Although these receivers may be far from the optimal receiver due to their noise characteristics, significant performance gain is claimed.

Bluetooth is a standard for wireless communication devices. In the radio specification such as "Specification of the Bluetooth System, 2.0+EDR" published on Nov. 4, 2004, GFSK modulation was used for "Basic Rate" transmission, in which bandwidth-period product (BT) of the GFSK modulation shall be 0.5 (i.e., BT=0.5), and the modulation index shall be between 0.28 and 0.35. Moreover, for GFSK modulation, one symbol represents one bit, of which a binary "1" is represented by a GFSK waveform with a positive frequency deviation and a binary "0" is represented by a GFSK waveform with a negative frequency deviation.

FIG. 1 is a diagram illustrating a transmitter and a receiver in a conventional communication system 10 using GFSK modulation. Referring to FIG. 1, binary data of 1's and 0's may be converted to non-return-to-zero (NRZ) signal by an NRZ converter 100 before passing through a Gaussian filter 102 followed by a frequency modulator 104. Let $b_n$ (either "0" or "1") denote the n-th information bit. For a given information bit stream, the output of the NRZ converter 100 can be represented as:

$$x(t) = \sum_{n=-\infty}^{\infty} (-1)^{b_n+1} \Pi(t - nT_s)$$

where $$\Pi(t) = \begin{cases} 1/T_s & -T_s/2 \le t \le T_s/2 \\ 0 & \text{Otherwise.} \end{cases}$$

In the above, $T_s$ is the symbol period and is 1 μs for Bluetooth. After being modulated by the frequency modulator 104 (with details to be given later), the binary data may then be up-converted to a radio frequency (RF) signal and transmitted as an RF signal by an RF transmitter 106. At the receiver side, a corresponding receiving path for a received RF signal may include an RF receiver and filter 108, a frequency discriminator 110 and a bitwise decoder 114. After the received RF signal is down-converted to a complex baseband signal including a real part "I" and an imaginary part "Q" by the RF receiver and filter 108, frequency deviation information of the real part I and the imaginary part Q may be extracted to generate a received symbol $r_n$ accordingly by the frequency discriminator 110. The bitwise decoder 114, by sampling an output of the frequency discriminator 110 at a correct timing, may decode the received symbol $r_n$ generated by the frequency discriminator 110 as a binary "1" when $r_n$ is positive, or otherwise a binary "0" when $r_n$ is negative. More details of the GFSK modulation and other alternative architectures can also be found in "Digital Communications, 4-th Ed." by J. Proakis (hereinafter "Proakis").

FIG. 2A is a block diagram of the frequency discriminator 110 and bitwise decoder 114 illustrated in FIG. 1. Referring to FIG. 2A, the frequency discriminator 110 may include a phase detector 11, a differentiator 12 and an integrate-and-dump filter 13. After the received RF signal is down-converted to the complex baseband signals I and Q and filtered by a receiving filter (the filter 108). The phase detector 11 may typically compute at an integer multiple times of the symbol rate, and its output based on the received I and Q samples indexed by "m" may be represented as follows:

$$\phi_m = \tan^{-1}\left(\frac{Q_m}{I_m}\right).$$

In the above, m is used as an index to differentiate from the "n" used for the n-th symbol. The differentiator 12 coupled with the phase detector 11 may derive a metric $\Delta\phi_m$ proportional to the frequency deviation, based on the sequence $\phi_m$, as follows:

$$\Delta\phi_m = \phi_m - \phi_{m-1}.$$

Since $\Delta\phi_m$ may typically be computed at an integer multiple time of the symbol rate and $r_n$ may only be needed at exactly the symbol rate, a symbol timing recover circuitry 13 may typically be used to derive the correct symbol timing from the $\Delta\phi_m$ sequence and to properly down-sample the $\Delta\phi_m$ sequence to obtain the $r_n$ sequence. Next, the bitwise decoder 114 may decode the received symbol $r_n$ to generate a binary "1" bit if $r_n$ is positive, and a binary "0" bit if $r_n$ is negative.

Referring again to FIG. 1, if the filtering effect at both transmitter side and receiver side is neglected, the discriminator output corresponding to a transmitted data bit "1" is a scaled transmitted Gaussian pulse: $\pi h\Pi(t)*g(t)$, with a detailed description of the transmitted Gaussian pulse provided later in association with FIGS. 3-4. In this case, the bitwise decoder 114, with help of the timing recovery circuitry 13, may sample the frequency discriminator output at its positive peak and output a decoded bit "1" with properly recovered symbol timing. Similarly, a transmitted "0" may appear at the frequency discriminator output as a negative scaled transmitted Gaussian pulse denoted as $-\pi h\Pi(t)*g(t)$, and the bitwise decoder 114 may sample the discriminator output at its negative peak and output a decoded bit 0. In summary, a conventional frequency discriminator 110, which includes a phase detector 11, a differentiator 12, and a timing recovery circuitry 13, is described. This frequency discriminator may be used to obtain the $r_n$ sequence for GFSK symbol decoding.

Let b be an N×1 information vector having the information bit $b_n$ as its elements, then $\underline{b}$ may be represented as:

$$\underline{b} = [b_0 b_1 \ldots b_n \ldots b_{N-1}]^T,$$

where $b_n \in \{0, 1\}$ and n is an index of symbol time.

Also let r be an N×1 received vector having the received symbol $r_n$ generated by the frequency discriminator 110 as its elements, then $\underline{r}$ may be represented as:

$$\underline{r} = [r_0 r_1 \ldots r_n \ldots r_{N-1}]^T.$$

Note that the numbers of the elements of the information vector b and the received vector $r_n$ may be different due to preamble bits, which may be assumed to be the information bits in the information vector b.

Moreover, $\underline{r}$ may also be represented as:

$$\underline{r} = \underline{x}(\underline{b}) + \underline{n},$$

where the N×1 vector $\underline{x}(\underline{b})$ may represent the signals without noise, but may include effects due to every filtering such as the Gaussian filter, the transmitter filter and the filtering at the receiver. The filtering by the wireless channel may usually be negligible. Moreover, mapping from the information vector b to the vector $\underline{x}(\underline{b})$ may be pre-calculated as:

$$x_n = \sum_{-L/2}^{L/2} h_l \cdot b_{n-l},$$

where $x_n$ is an element of the vector $\underline{x}(\underline{b})$ and $h_l$ is its impulse response.

From Proakis, an n-th decoded bit, $\hat{b}_{n,MLSD}$, of an optimal maximum-likelihood sequence detection (MLSD) decoder can be represented as:

$$\hat{b}_{n,MLSD} = \underset{\hat{b}_n}{\operatorname{argmax}}\left\{\underset{\underline{b}:\hat{b}_n}{\max} P(\underline{r}\,|\,\underline{x}(\underline{b}))\right\},$$

where $P(\underline{r}|\underline{x}(\underline{b}))$ is a conditional probability of $\underline{r}$ given $\underline{x}(\underline{b})$, and "$\underline{b}:\hat{b}_n$" stands for all the possible $\underline{b}$ (i.e., a sequence) consistent with $b_n$ (i.e., a bit). However, those skilled in the art can understand that an optimal MLSD decoder may be difficult to implement.

A sub-optimal MLSD decoder may be developed by assuming noise as additive Gaussian noise of which an n-th decoded bit $\hat{b}_{n,s-MLSD}$ may be represented as:

$$\hat{b}_{n,S-MLSD} = \underset{\hat{b}_n}{\operatorname{argmin}}\left\{\underset{\underline{b}:\hat{b}_n}{\min} |\underline{r} - \underline{x}(\underline{b})|^2\right\}.$$

The abovementioned bitwise decoder may be replaced by another sub-optimal MLSD decoder for enhancing coding gains. FIG. 2B is a block diagram illustrating the frequency discriminator 110 and a sub-optimal MLSD decoder, that is, a Viterbi decoder (VD) 200. However, those skilled in the art can easily understand that a Viterbi decoder may be too complicated to implement unless the number of its trellis states can be reduced to 4 or 8, which is also known as a "truncated" Viterbi decoder.

Laurent proposed a linear approximation so that a simplified $c_0$ matched filter may be used as an approximated matched-filter receiver for implementing the optimal decoder. However, for applications such as the Bluetooth, the modulation index h of the GFSK modulation may be between 0.28 and 0.35. The Viterbi decoder proposed in Soltanian may be vulnerable to inaccuracies in such modulation index h, whereby it was shown to be robust only for variations of the modulation index h within 0.01 (i.e., $|\Delta h| \leq 0.01$). Similarly, a proposed Laurent-decomposition-based near-optimum receiver may be found to require a very accurate h estimate.

It may therefore be desirable to have a sub-optimal receiver with a decoder which is simple and robust to the uncertain parameters, and applicable to single-carrier communication systems using the GFSK modulation for demodulating and/or decoding a GFSK signal.

BRIEF SUMMARY OF THE INVENTION

Examples of the present invention may provide a receiver capable of decoding a symbol based on information on a previous symbol, the symbol and a next symbol in a Gaussian frequency shift keying (GFSK) communication system. The receiver comprises a discriminator to generate a symbol for each bit in a bit sequence, a first lookup table (LUT) to store a number of bit patterns and mapping patterns, wherein each of the bit patterns is in the form of a set of consecutive bits in the bit sequence and corresponds to a respective one of the mapping patterns, and wherein each of the mapping patterns includes a set of entries and each of the entries results from an operation of attribute values at a sample time in the waveform of a symbol, a calculator to receive a set of consecutive symbols from the discriminator and calculate a distance value between the set of consecutive symbols and each of the mapping patterns, and a comparator to identify one of the mapping patterns with a minimum distance value by comparing among the distance values from the calculator.

Other examples of the present invention may also provide a receiver capable of decoding a symbol based on information on a previous symbol, the symbol and a next symbol in a Gaussian frequency shift keying (GFSK) communication system. The receiver comprises a discriminator to generate a symbol for each bit in a bit sequence, a first lookup table (LUT) to store a number of bit patterns and mapping patterns, wherein each of the bit patterns is in the form of a set of (2n+1) consecutive bits with the leading "n" bits of each of the bit patterns being predetermined, and corresponds to a respective one of the mapping patterns, "n" being an integer equal to or greater than 1, and wherein each of the mapping patterns includes a set of entries and each of the entries results from an operation of attribute values at a sample time in the waveform of a symbol, a calculator to receive a set of consecutive symbols from the discriminator and calculate a distance value between the set of consecutive symbols and each of the mapping patterns, and a comparator to identify one of the mapping patterns with a minimum distance value by comparing among the distance values from the calculator.

Some examples of the present invention may further provide a method of decoding a symbol based on information on a previous symbol, the symbol and a next symbol in a Gaussian frequency shift keying (GFSK) communication system. The method comprises generating a symbol for each bit in a bit sequence, providing a first lookup table (LUT) configured to store a number of bit patterns and mapping patterns, wherein each of the bit patterns is in the form of a set of consecutive bits in the bit sequence and corresponds to a respective one of the mapping patterns, and wherein each of the mapping patterns includes a set of entries and each of the entries results from an operation of attribute values at a sample time in the waveform of a symbol, receiving a set of consecutive symbols, calculating a distance value between the set of consecutive symbols and each of the mapping patterns, identifying one of the mapping patterns with a minimum distance value by comparing among the distance values from the calculator, and identifying one of the bit patterns corresponding to the identified one mapping pattern, the middle bit of the identified one bit pattern to serve as a decoded bit for the symbol.

Examples of the present invention may also provide a method of decoding a symbol based on information on a previous symbol, the symbol and a next symbol in a Gaussian frequency shift keying (GFSK) communication system. The method comprises generating a symbol for each bit in a bit sequence, providing a first lookup table (LUT) configured to store a number of bit patterns and mapping patterns, wherein each of the bit patterns is in the form of a set of (2n+1) consecutive bits with the leading "n" bits of each of the bit patterns being predetermined, and corresponds to a respective one of the mapping patterns, "n" being an integer equal to or greater than 1, and wherein each of the mapping patterns includes a set of entries and each of the entries results from an operation of attribute values at a sample time in the waveform of a symbol, receiving a set of consecutive symbols, calculating a distance value between the set of consecutive symbols and each of the mapping patterns, identifying one of the mapping patterns with a minimum distance value by comparing among the distance values from the calculator, and identifying one of the bit patterns corresponding to the identified one mapping pattern, the middle bit of the identified one bit pattern to serve as a decoded bit for the symbol.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 3:
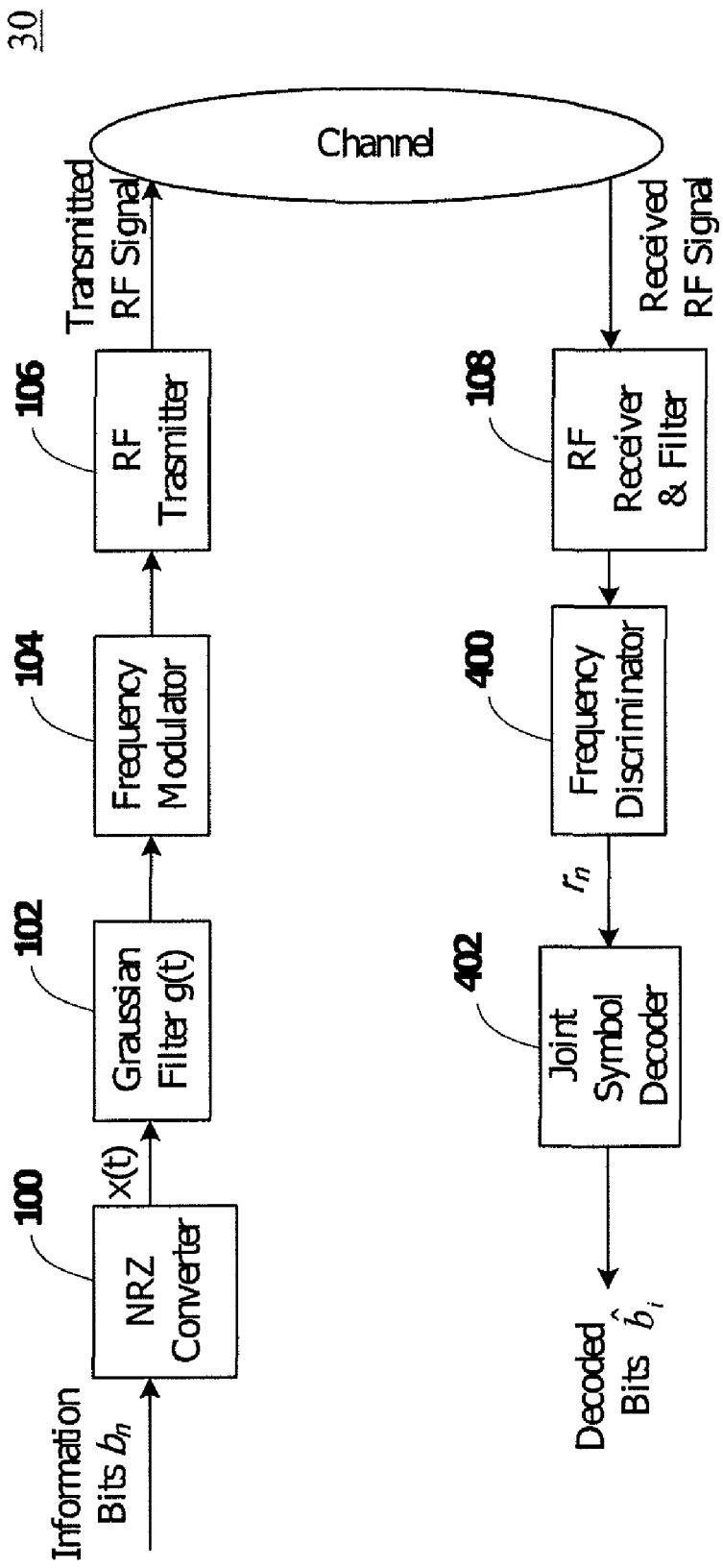
FIG. 3 is a block diagram of a communication system according to an example of the present invention.

FIG. 3 is a block diagram of a communication system 30 according to an example of the present invention. Referring to FIG. 3, the communication system 30 may include, among others, a frequency discriminator 400 and a joint symbol decoder (JSD) 402 at the receiver side. Furthermore, the communication system 30 may optionally include a filter (not shown) between the frequency discriminator 400 and the joint symbol decoder 402.

Figure 4:
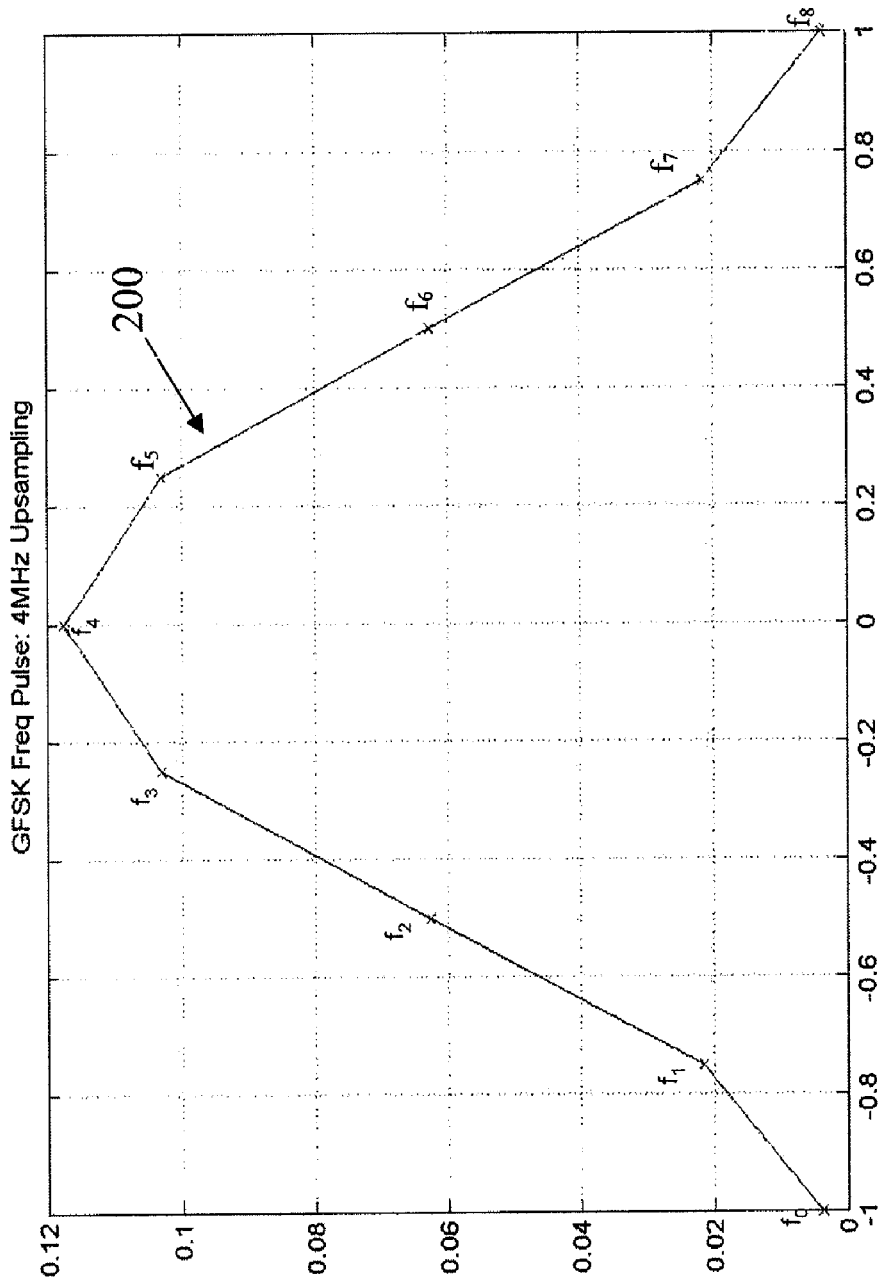
FIG. 4 is a digital implementation of the transmitted Gaussian pulse, based on the Gaussian filter illustrated in FIG. 3.

FIG. 4 illustrates a digital implementation of the transmitted Gaussian pulse for a GFSK modulated signal, based on the Gaussian filter 102 g(t) illustrated in FIG. 3. Referring back to FIG. 3, the impulse response of the Gaussian filter 102 may be represented as:

$$g(t) = B\sqrt{\frac{2\pi}{\ln 2}} \exp\left(-\frac{2\pi^2 B^2}{\ln 2} t^2\right) \text{ where } B = \frac{1}{2T_s}$$

for Bluetooth applications.

Since the output of the NRZ converter 100 can be represented as:

$$x(t) = \sum_{n=-\infty}^{\infty} (-1)^{b_n+1} \Pi(t-nT_s)$$

where $$\Pi(t) = \begin{cases} 1/T_s & -T_s/2 \le t \le T_s/2 \\ 0 & \text{Otherwise,} \end{cases}$$

the digital implementation may include a composite impulse response for Π(t)*g(t), where "*" denotes convolution. Referring to FIG. 4, where f denotes an exemplary digital implementation of the composite impulse response at a 4 MHz sampling rate, f is represented by the values of $f_0$, $f_1, \ldots, f_8$. Although FIG. 4 shows f as a piecewise linear curve having eight pieces, only the 9 sampling points of the piecewise linear curve matter when the receiver samples the received signal at the correct timing. The curve is symmetric as the composite impulse response $\Pi(t/T_s)*g(t/T_s)$ is symmetric. As can be seen, $f_4$ may represent the point where the impulse response of a desired symbol is exactly sampled, and the first sample $f_0$ and the last sample $f_8$ may represent the ISI while decoding a previous symbol and a next symbol, respectively.

Based on the output of the Gaussian filter 102, the frequency modulator 104 may generate a modulated signal, which is also a baseband signal and may be represented as:

$$x_m(t) = \cos(\phi_m(t)),$$

where $$\phi_m(t) = \pi h \int_{-\infty}^{t} x(\tau) * g(\tau) d\tau.$$

The RF transmitter 106 may then up-convert the baseband signal $x_m(t)$ and generate an transmitted RF signal in the form of:

$$x_{RF}(t) = \cos(2\pi f_c t + \phi_m(t)),$$

where $f_c$ may be 2402, 2403, 2404, ..., or 2480 MHz for Bluetooth applications in a frequency hopping system.

In the RF receiver and filter 108, the received radio frequency (RF) signal may be down-converted to complex baseband signals I and Q. Information on frequency deviation may then be extracted by the frequency discriminator 400.

In one example, if the noise and filter distortion are negligible, the output of the frequency discriminator 400 may be represented as:

$$r(t) = \pi h \, x(t) * g(t).$$

Let $r_n$ be the discriminator output of an n-th symbol (the current symbol) of the received signal sampled at a peak (either positive or negative peaks) of the symbol. The $r_n$ sequence may be fed into the JSD 402 for decoding of the n-th symbol in the JSD 402, which takes into account the received information of a previous symbol $r_{n-1}$ (the (n−1)-th symbol) and a next symbol $r_{n+1}$ (the (n+1)-th symbol) in decoding the current symbol.

Figure 5:
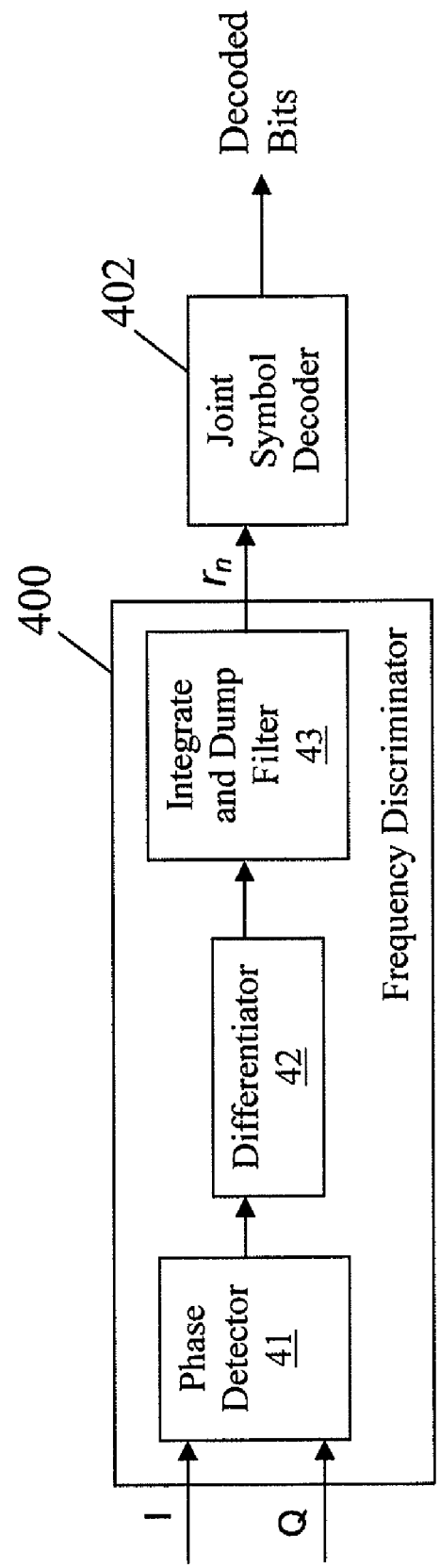
FIG. 5 is a block diagram of a frequency discriminator and a joint symbol decoder according to an example of the present invention.

FIG. 5 is a block diagram of the frequency discriminator 400 and the joint symbol decoder (JSD) 402 illustrated in FIG. 3. Referring to FIG. 5, the frequency discriminator 400 may include a phase detector 41, a differentiator 42. After the received RF signal is down-converted to the complex baseband signals I and Q, information on the frequency deviation between the real part signal I and the imaginary part signal Q may be extracted by the phase detector 41 in exactly the same way as the phase detector 11 did. The differentiator 42 may generate a sequence of symbols in exactly the same way as the differentiator 12 did.

Moreover, the JSD 402 may decode a current symbol in a sequence of symbols by using received information on previous, current, and next symbol (s). In one example, the JSD 402 may use the information on two previous symbols (i.e., 2 previous bits) and two next symbols (i.e., 2 next bits) to decode the current symbol, which may provide desirable performance with adequate complexity. In other examples, however, information on other numbers of previous symbols or next symbols may be used in decoding the current symbol.

Figure 6:
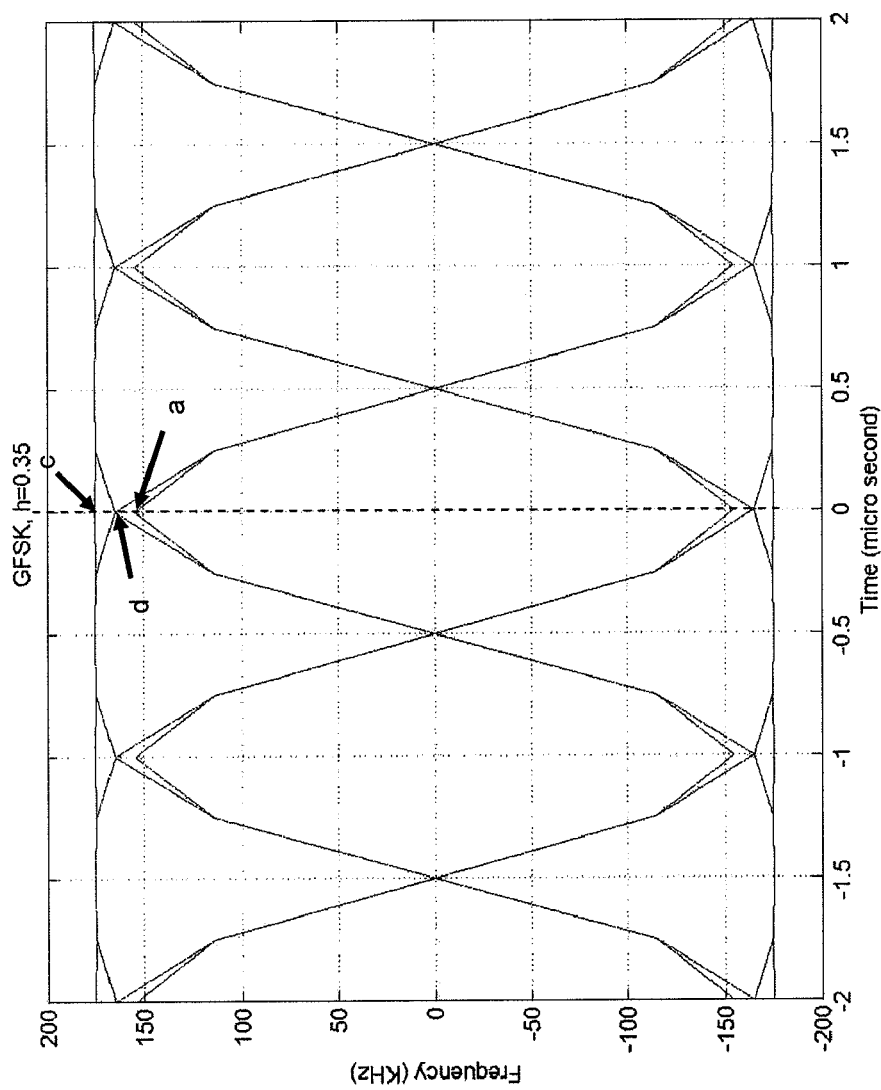
FIG. 6 is an eye diagram of the output of a frequency discriminator according to an example of the present invention.

FIG. 6 is an eye diagram for the output of the frequency discriminator 400 with Bluetooth GFSK modulated signals having h=0.35 according to an example of the present invention. Referring to FIG. 6, the x-axis represents time in micro seconds (μs) and a symbol time $T_s$ of the modulated signals is 1 μs in this example. Furthermore, the y-axis represents an output of the frequency discriminator 400 in kilohertz (KHz). At the output of the frequency discriminator 400, it is assumed that the ISI spans 1 symbol period to its previous and next symbols, based on the transmitted Gaussian pulse shown in FIG. 4. In this example, at the output of the frequency discriminator 400 at the n-th correct symbol time $T_s$, a current symbol $r_n$ can have three possible attribute values a, d and c, if the received symbol $r_n$ represents a transmitted data bit having a value "1". On the other hand, another three possible attribute values −a, −d, −c may be sampled at the output of the frequency discriminator 400 if the current symbol $r_n$ represents a transmitted data bit having a value "0". The attribute values ±a, ±d and ±c may reflect the attributes of a symbol at the output of the frequency discriminator 400 and may be detected in the waveform of the symbol. One should note that the filter effect has been neglected in this example. The 3 possible values for a transmitted "1" or "0" can occur as a transmitted Gaussian pulse has characteristics shown in FIG. 4 for a Bluetooth GFSK modulation, and such a transmitted Gaussian pulse is not be inter-symbol interference (ISI)-free.

Referring again to FIGS. 4 and 6, when a data bit "1" is transmitted, it can be derived that at the output of the frequency discriminator 400, $$a = \frac{h}{4T_s}(f_4 - 2f_0),$$

$$d = \frac{hf_4}{2T_s},$$

$$c = \frac{h}{2T_s}(f_4 + 2f_0).$$

That is, if the transmitted data bit related to the sampled current symbol is "1", there may be three possible discriminator outputs:

(1) the sampled value at the output of the frequency discriminator 400 is equal to "c" when the previous data bit, the current data bit and the next data bit are all equal to 1;

(2) the sampled value at the output of the frequency discriminator 400 is equal to "a" when the current data bit is 1, and both the previous data bit and the next data bit are 0's; and (3) the sampled value at the output of the frequency discriminator 400 is equal to "d" when the current data bit is 1, and the previous bit and the next bit are different.

Similarly, if the transmitted data bit related to the sampled current symbol is "0", there may be another three possible discriminator outputs:

(4) the sampled value at the output of the frequency discriminator 400 is equal to "−c" when the previous data bit, the current data bit and the next data bit are all equal to 0;

(5) the sampled value at the output of the frequency discriminator 400 is equal to "−a" when the current data bit is 0, and both the previous data bit and the next data bit are 1's; and (6) the sampled value at the output of the frequency discriminator 400 is equal to "−d" when the current data bit is 0, and the previous bit and the next bit are different.

In this example, let $r_{n-2}$ and $r_{n-1}$ denote the two previous symbols, $r_n$ the current symbol, and $r_{n+1}$ and $r_{n+2}$ the two next symbols sampled at the output of the frequency discriminator 400. When three consecutive bits ($b_{-1}, b_0, b_1$) are transmitted, corresponding output patterns at the output of the frequency discriminator 400 can be found in Table 1.

TABLE 1

Possible received patterns for 3 consecutive transmitted bits (h = 0.35)

| Transmitted Bit Pattern ($b_{-1}, b_0, b_1$) | All Possible Received Patterns |
|---|---|
| 111 | (c, c, c), (c, c, d), (d, c, c), (d, c, d) |
| 011 | (−a, d, c), (−a, d, d), (−d, d, c), (−d, d, d) |
| 101 | (d, −a, d), (d, −a, a), (a, −a, d), (a, −a, a) |
| 001 | (−d, −d, d), (−d, −d, a), (−c, −d, d), (−c, −d, a) |
| 110 | (d, d, −d), (d, d, −a), (c, d, −d), (c, d, −a) |
| 010 | (−d, a, −d), (−d, a, −a), (−a, a, −d), (−a, a, −a) |
| 100 | (a, −d, −c), (a, −d, −d), (d, −d, −c), (d, −d, −d) |
| 000 | (−c, −c, −c), (−c, −c, −d), (−d, −c, −c), (−d, −c, −d) |

Taking the bit pattern 111 as an example, for the first or leftmost bit "1", its previous bit is either "0" or "1". Similarly, for the third or rightmost bit "1", its next bit is either "0" or "1". Accordingly, to determine the possible received patterns for the bit pattern 111, four possible bit sequences are at issue, namely, 01110, 01111, 11110 and 11111. For the possible bit sequence 01110, since the first "1" comes after the middle "1" and before "0", a value "d" is assigned in accordance with the above rule (3). Likewise, a value "c" is assigned to the middle "1" in accordance with the above rule (1). Furthermore, another "d" is assigned to the third "1" in accordance with the above rule (3). As a result, the possible received pattern for the bit sequence 01110 is (d, c, d).

For the possible bit sequence 01111, since the first "1" is between "0" and "1", a value "d" is assigned in accordance with rule (3). Likewise, a value "c" is assigned to the middle "1" in accordance with rule (1). Furthermore, another "c" is assigned to the third "1" in accordance with the above rule (1) because the third "1" is between two "1's". As a result, the possible received pattern for the bit sequence 01111 is (d, c, c).

Similarly, the possible received patterns for the bit sequences 11110 and 11111 are (c, c, d) and (c, c, c), respectively. Accordingly, four possible received patterns for the bit pattern 111 are determined.

In Table 1, one bit pattern corresponds to four possible received patterns. To facilitate the mapping relationship, in one example, all the possible received patterns with respect to a transmitted bit pattern in Table 1 may be simplified to include only one mapping pattern, such as an average received pattern of the all possible patterns, for each transmitted consecutive three bits as shown in Table 2, which in turn may reduce time to do comparison for checking the output patterns of the frequency discriminator 400 to look for corresponding three consecutive transmitted bits with Table 2.

TABLE 2

Simplified patterns for 3 consecutive transmitted bits (h = 0.35)

| Transmitted Bit Pattern ($b_{-1}, b_0, b_1$) | Simplified Average Received Patterns (1 pattern for each transmitted 3-bit pattern) |
|---|---|
| 111 | ((d + c)/2, c, (d + c)/2) |
| 011 | (−(a + d)/2, d, (d + c)/2) |
| 101 | ((a + d)/2, −a, (a + d)/2) |
| 001 | (−(d + c)/2, −d, (a + d)/2) |
| 110 | ((d + c)/2, d, −(a + d)/2) |
| 010 | (−(a + d)/2, a, −(a + d)/2) |
| 100 | ((a + d)/2, −d, −(d + c)/2) |
| 000 | (−(d + c)/2, −c, −(d + c)/2) |

Taking the bit pattern 111 as an example, given the four possible received patterns (c, c, c), (c, c, d), (d, c, c) and (d, c, d) in Table 1, the average received pattern is ((c+c+d+d)/4, (c+c+c+c)/4, (c+d+c+d)/4), which results in ((d+c)/2, c, (d+c)/2), as shown in Table 2. In determining the average received pattern, each entry of the four possible received patterns is given a same weight. For example, in the case of (c+c+d+d)/4, the first "c" comes from the first entry of the possible received pattern (c, c, c), the second "c" from the first entry of the possible received pattern (c, c, d), the first "d" from the first entry of the possible received pattern (d, c, c) and the second "d" from the first entry of the possible received pattern (d, c, d), each first entry having the same weight. In Table 2, the bit patterns and the possible received patterns have a one-on-one (1-1) relationship. That is, each of the bit patterns maps into one and only one of the possible received patterns, and vice versa.

Moreover, since the output of frequency discriminator 400 is symmetric about 1's and 0's, the average ISI due to GFSK symbols before and after an n-bit sequence passed into the JSD 402 should be zero. Therefore, an "average received pattern" for its corresponding n-bit sequence may also be pre-calculated by computer simulation based on an isolated n-bit sequence.

Moreover, although outputs of the frequency discriminator 400 are generated based on h=0.35, for Bluetooth applications, h may range from 0.28 to 0.35 with a median of 0.315. To allow Table 2 to be applicable to the range of h, the a, d, and c values may be scaled by a scaling factor 0.9 (=0.315/0.35), as shown in Table 3 below, of which pattern indexes are also introduced in the first column.

TABLE 3

Simplified patterns for 3 consecutive transmitted bits (for BT Applications having h ranges from 0.28 to 0.35 with a median 0.315)

| Pattern Index | Transmitted 3-Bit Pattern ($b_{-1}, b_0, b_1$) | Simplified Average Received Patterns (1 pattern for each transmitted 3-bit pattern) |
|---|---|---|
| 7 | 111 | 0.9 ((d + c)/2, c, (d + c)/2) |
| 6 | 011 | 0.9 (−(a + d)/2, d, (d + c)/2) |
| 5 | 101 | 0.9 ((a + d)/2, −a, (a + d)/2) |
| 4 | 001 | 0.9 (−(d + c)/2, −d, (a + d)/2) |
| 3 | 110 | 0.9 ((d + c)/2, d, −(a + d)/2) |
| 2 | 010 | 0.9 (−(a + d)/2, a, −(a + d)/2) |
| 1 | 100 | 0.9 ((a + d)/2, −d, −(d + c)/2) |
| 0 | 000 | 0.9 (−(d + c)/2, −c, −(d + c)/2) |

In Table 3, each of the bit patterns has a pattern index different from one another so that the pattern indexes have a one-on-one (1-1) relationship with the bit patterns, which in turn, as previously discussed, have a one-on-one relationship with the average received patterns. In one example according to the present invention, the pattern index of a bit pattern may be calculated by multiplying the n-th bit with the (n−1)-th power of two and then summing the products. Taking the bit pattern 011 as an example, its pattern index equals $2^0 \times 0 + 2^1 \times 1 + 2^2 \times 1 = 6$.

A Bluetooth data packet may comprise a known-pattern preamble and a sync word, which contains known bits for packet acquisition, timing synchronization, frequency offset estimation and compensation. Accordingly, in another example, the known-pattern preamble and the sync word may also be used to estimate (or update) the average received patterns.

Figure 7A:
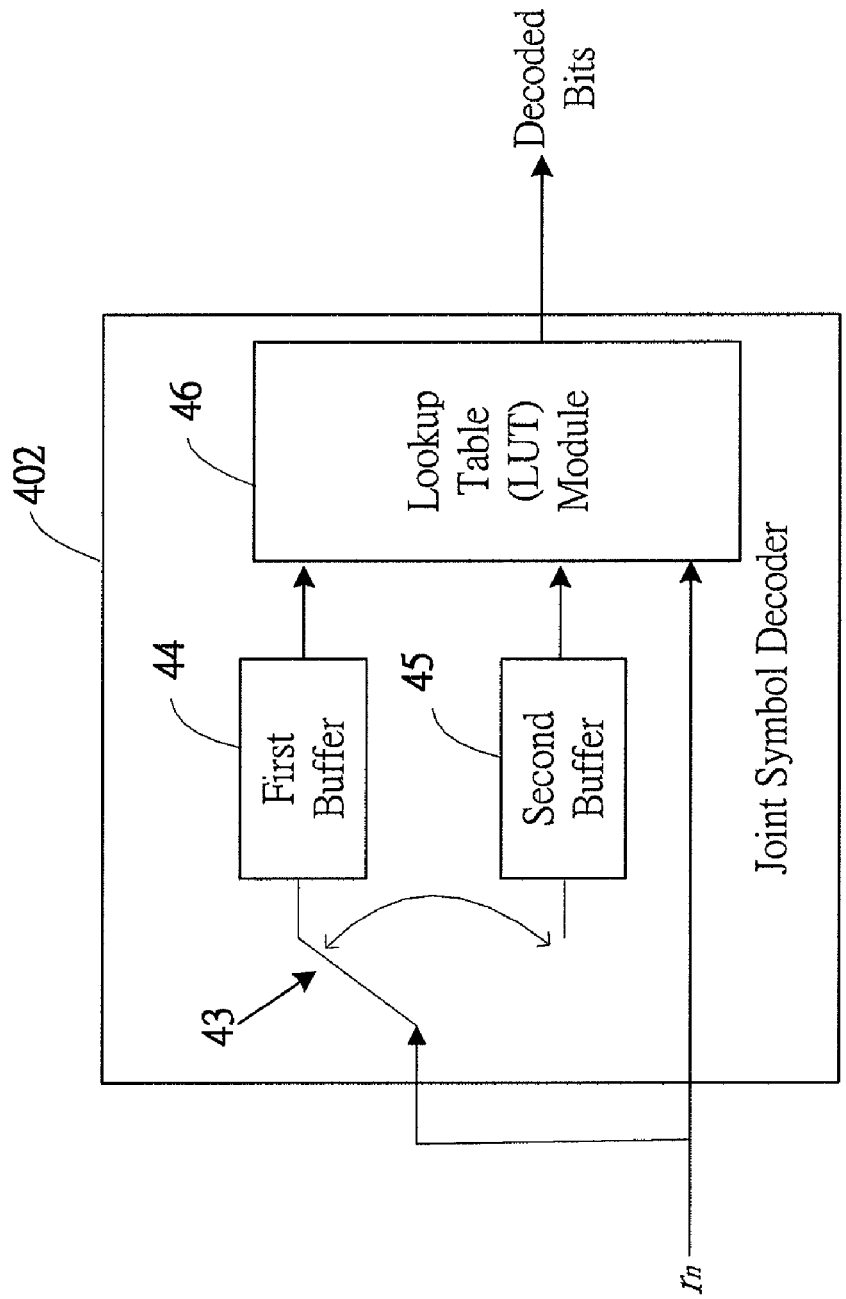
FIG. 7 is a block diagram of a joint symbol decoder according to an example of the present invention.
Figure 7B:
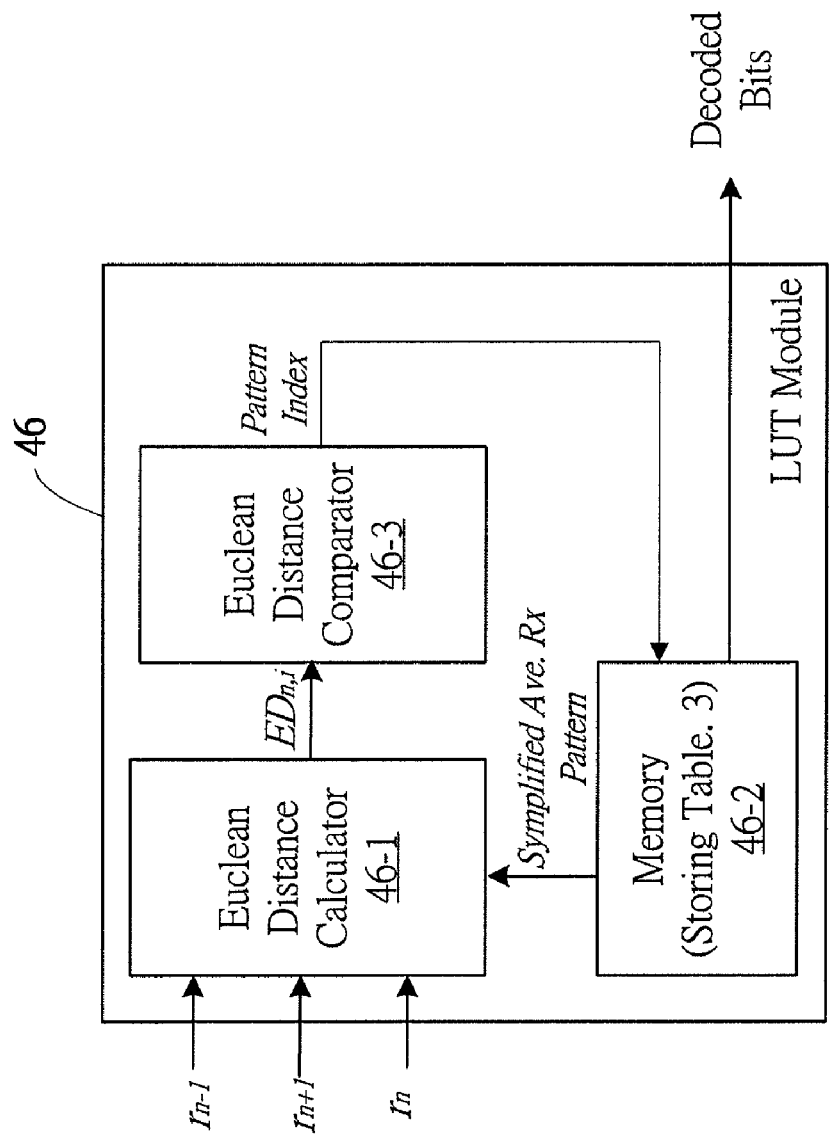

FIG. 7 is a block diagram of the joint symbol decoder 402. Referring to FIG. 7, the joint symbol decoder 402 may include a Euclean distance (ED) calculator 46-1, a memory 46-2 and an ED comparator 46-3. The ED calculator 46-1 may be configured to calculate a Euclean distance $ED_{n,i}$ between the three consecutive outputs $(r_{n-1}, r_n, r_{n+1})$ as a set and each of the simplified average received patterns in Table 3, where i=1 to 8 denotes an i-th Euclean distance between $(r_{n-1}, r_n, r_{n+1})$ and an i-th simplified average received pattern. The memory 46-2 may be configured to store the Table 3 and, based on a decided pattern index, output the simplified average received patterns for calculating an ED and output the transmitted 3-bit pattern $(b_{-1}, b_0, b_1)$. Moreover, the ED comparator 46-3 may be configured to compare each of the $ED_{n,i}$ to find a minimum ED of the eight EDs, and decide a pattern index corresponding to the minimum ED.

Figure 8:
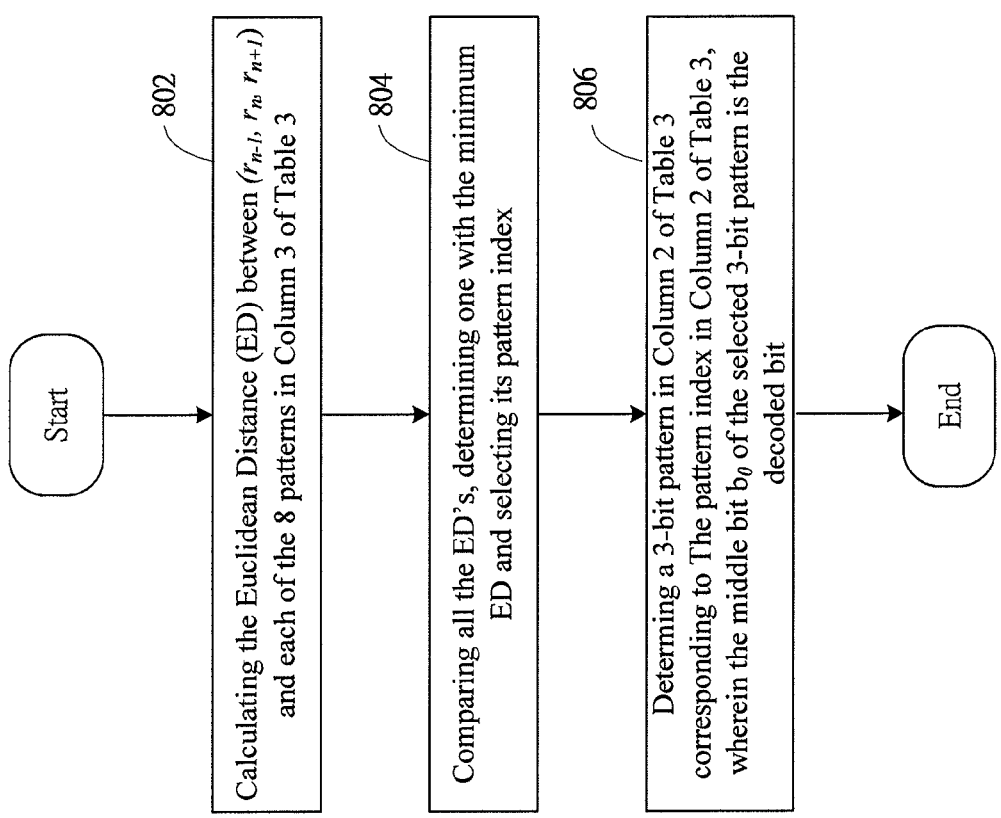
FIG. 8 is a flow diagram illustrating a method of decoding a BT GFSK received symbol according to an example of the present invention.

FIG. 8 is a flow diagram illustrating a method of the joint symbol decoder 402 using Table 3 of the present invention. Referring to FIG. 8, at step 802, each of the EDs between $(r_{n-1}, r_n, r_{n+1})$ and simplified average received patterns (in column 3 of Table 3) outputted from the memory 46-2 storing Table 3 may be calculated by the ED calculator 46-1.

Next, at step 804, all of the calculated EDs may be compared with each other by the ED comparator 46-3 to identify a pattern index with its simplified average received pattern having the minimum ED from the frequency discriminator outputs $(r_{n-1}, r_n, r_{n+1})$.

The identified pattern index may then be fed back to the memory 46-2 for looking up Table 3 to find its corresponding 3-bit pattern at step 806. Subsequently, the middle bit $b_0$ of the 3-bit pattern may be output by the joint symbol decoder 402 as a decoded bit.

In another example, in the presence of a transmitting filter and/or a receiving filter, Table 3 may be modified based on computer simulation results. As previously mentioned, when the effect of the transmitting filter and/or the receiving filter is taken into account, the JSD 402 may need to take care of two previous symbols, two next symbols and the current symbol (i.e., $r_{n-2}, r_{n-1}, r_n, r_{n+1}, r_{n+2}$) while decoding an n-th symbol. In this case, optimum patterns may slightly deviate from patterns only consisting of the following values: +/−a, +/−d, +/−c, +/−(a+d)/2, and +/−(d+c)/2 (as shown in Table 2) before being scaled for doing an h-adjustment (i.e., adjusting values of Table 2 to values of Table 3). A table including one pattern for each of 32 possible 5-bit patterns may be established within the joint symbol decoder 402, and method of decoding the n-th symbol (with respect to the current symbol) may be similar to those described and illustrated with reference to FIG. 8. In other words, one can simply replace the Table 3 stored in memory 46-2 by a table now storing 32 patterns.

Modification to the table may require additional complexity at the receiver, a bigger memory for memory 46-2, as the ED between a received 5-bit pattern $[r_{n-2}, r_{n-1}, r_n, r_{n+1}, r_{n+2}]$ and 32 patterns may need to be calculated and determined before decoding the n-th symbol.

Moreover, a joint symbol decoding algorithm as the methods and/or the tables mentioned above may further be simplified by adopting a decision-feedback decoding scheme for a reason that while decoding the n-th symbol, both the (n−2)-th and the (n−1)-th symbols are decoded previously. Information of the previously decoded symbols may be used to reduce the number of patterns of a LUT to be compared from 32 to 8.

Furthermore, such a decoding algorithm may use a LUT comprising average received patterns for decoding 5-bit sequences. Let an average received pattern, $$P_{k_5} = [p_{-2,k_5}, p_{-1,k_5}, p_{0,k_5}, p_{1,k_5}, p_{2,k_5}],$$

be defined as a 5-sample discriminator output with samples obtained at correct symbol timing without noise. Corresponding to an isolated transmitted 5-bit sequence, i.e., a bit pattern $B_{k_5} = [b_{-2}, b_{-1}, b_0, b_1, b_2]$, where $b_i$ (for i=−2, −1, 0, 1 or 2) may be 1 or 0, and its pattern index is $k_5 = b_{-2} + 2b_{-1} + 4b_0 + 8b_1 + 16b_2$, wherein "$b_0$" in the middle represents the current bit, the two bits $b_{-2}$ and $b_{-1}$ represent previous bits and the two bits $b_1$ and $b_2$ represent next bits. Note that in the absence of transmitter and receiver filters, $p_{i,k_5}$ (for i=−2, −1, 0, 1 or 2) may only be equal to +/−a, +/−d, +/−c, +/−(a+d)/2, or +/−(d+c)/2 for h=0.35. Before the JSD 402 can function, all possible average received patterns $P_{k_5}$ for the pattern index $k_5$=0 to 31, consisting of a total of 32 received patterns and each of which corresponding to a possible transmitted 5-bit sequence $B_{k_5} = [b_{-2}, b_{-1}, b_0, b_1, b_2]$ may need to be known in advance. In another example, all the average received patterns may be pre-calculated via computer simulations considering ISI effect of typical transmitter and receiver filters, and stored as fixed values in the LUT of the JSD 402.

Let the previous two bits of a current bit $b_0$ be "$b_{-2,dec}$" and "$b_{-1,dec}$". The JSD 402 may compute an Euclidean distance between a received discriminator output pattern $R = [r_{-2}, r_{-1}, r_0, r_1, r_2]$ and the 8 possible average received patterns $P_{k_5}$, of which the pattern index $k_5$ has its $b_{-2}$ and $b_{-1}$ equal to $b_{-2,dec}$ and $b_{-1,dec}$, respectively, and select a pattern $P_{k_5,min}$ having the minimum Euclidean distance. The current bit $b_0$ may then be decoded according to a pattern index $k_{5,min}$. Tables 4A to 4D shows all four possible decoding tables for any "middle" current bit which has at least two previous bits and two next bits, wherein the first column of the Tables 4A to 4D shows the pattern index $k_5$, the second column shows the corresponding transmitted 5-bit sequence $B_{k_5}$, and the third column shows the decoded current (middle) bit. Moreover, those skilled in the art can easily understand that the four Tables 4A to 4D may be formed for various combinations of two "previous bits".

TABLE 4A

| JSD decoding table for the third bit and beyond (except for the last two bits) when 2 previously decoded bits are 00 | | |
|---|---|---|
| $k_5$ | Transmitted Bit Pattern | Decoded Bit |
| 0 | 00000 | 0 |
| 4 | 00100 | 1 |
| 8 | 00010 | 0 |
| 12 | 00110 | 1 |
| 16 | 00001 | 0 |
| 20 | 00101 | 1 |

TABLE 4A-continued

JSD decoding table for the third bit and beyond (except for
the last two bits) when 2 previously decoded bits are 00

| $k_5$ | Transmitted Bit Pattern | Decoded Bit |
|---|---|---|
| 24 | 00011 | 0 |
| 28 | 00111 | 1 |

TABLE 4B

JSD decoding table for the third bit and beyond (except for
the last two bits) when 2 previously decoded bits are 10

| $k_5$ | Transmitted Bit Pattern | Decoded Bit |
|---|---|---|
| 1 | 10000 | 0 |
| 5 | 10100 | 1 |
| 9 | 10010 | 0 |
| 13 | 10110 | 1 |
| 17 | 10001 | 0 |
| 21 | 10101 | 1 |
| 25 | 10011 | 0 |
| 29 | 10111 | 1 |

TABLE 4C

JSD decoding table for the third bit and beyond (except for
the last two bits) when 2 previously decoded bits are 01

| $k_5$ | Transmitted Bit Pattern | Decoded Bit |
|---|---|---|
| 2 | 01000 | 0 |
| 6 | 01100 | 1 |
| 10 | 01010 | 0 |
| 14 | 01110 | 1 |
| 18 | 01001 | 0 |
| 22 | 01101 | 1 |
| 26 | 01011 | 0 |
| 30 | 01111 | 1 |

TABLE 4D

JSD decoding table for the third bit and beyond (except for
the last two bits) when 2 previously decoded bits are 11

| $k_5$ | Transmitted Bit Pattern | Decoded Bit |
|---|---|---|
| 3 | 11000 | 0 |
| 7 | 11100 | 1 |
| 11 | 11010 | 0 |
| 15 | 11110 | 1 |
| 19 | 11001 | 0 |
| 23 | 11101 | 1 |
| 27 | 11011 | 0 |
| 31 | 11111 | 1 |

In the present example, for a discriminator-based decoder, the 5 $r_i$'s in the discriminator output pattern R may be applicable to decode the two previous bits, the current bit, and the two next bits. However, to decode the first (or the last) bit optimally with the JSD 402, when there is no previous bits or next bits, an average received pattern $P_{k_3}=[p_{0,k_3}, p_{1,k_3}, p_{2,k_3}]$, which is a 3-sample discriminator output, with samples obtained at correct symbol timing corresponding to an isolated transmitted 3-bit sequence, i.e., a bit pattern $B_{k_3}=[b_0, b_1, b_2]$, wherein its pattern index $k_3=b_0+2b_1+4b_2$ and $k_3$ ranging from 0 to 7, may be pre-computed and stored in another LUT. Table 5 shows a decoding table for the first bit or last bit.

TABLE 5

JSD decoding table for the first bit and the last bits

| $k_3$ | Transmitted Bit Pattern | Decoded First Bit | Decoded Last Bit |
|---|---|---|---|
| 0 | 000 | 0 | 0 |
| 1 | 100 | 1 | 0 |
| 2 | 010 | 0 | 0 |
| 3 | 110 | 1 | 0 |
| 4 | 001 | 0 | 1 |
| 5 | 101 | 1 | 1 |
| 6 | 011 | 0 | 1 |
| 7 | 111 | 1 | 1 |

Those skilled in the art can understand that in the Bluetooth data packet, known preamble bits may be sent before data bits. Therefore, the first data bit may also have two known previous bits (i.e., belonging to the preamble bits), and thus the first data bit may be capable of being decoded as if the two previous bits are available. Similar concept may also be applied for decoding the last bit.

In order to decode the second data bit optimally with the JSD 402, sixteen additional average received patterns $P_{k_4}=[p_{-1,k_4}, p_{0,k_4}, p_{2,k_4}]$, which is a 4-sample discriminator output with samples obtained at the correct symbol timing corresponding to an isolated transmitted 4-bit sequence, i.e., a bit pattern $B_{k_4}=[b_{-1}, b_0, b_1, b_2]$, where its pattern index is $k_4=b_{-1}+2b_0+4b_1+8b_2$ with $k_4$ ranging from 0 to 15 may be elected to be estimated. Similar to Tables 4A to 5, Tables 6A and 6B show two decoding tables for the second bit of which one table may be used for decoding the second data bit depending on value of the first bit is a 1 or 0.

TABLE 6A

JSD decoding table for the first bit and the
last bits when the first decoded bit is 0

| $k_4$ | Transmitted Bit Pattern | Decoded Second Bit | Decoded Second to Last Bit |
|---|---|---|---|
| 0 | 0000 | 0 | 0 |
| 2 | 0100 | 1 | 0 |
| 4 | 0010 | 0 | 1 |
| 6 | 0110 | 1 | 1 |
| 8 | 0001 | 0 | 0 |
| 10 | 0101 | 1 | 0 |
| 12 | 0011 | 0 | 1 |
| 14 | 0111 | 1 | 1 |

TABLE 6B

JSD decoding table for the first bit and the
last bits when the first decoded bit is 1

| $k_4$ | Transmitted Bit Pattern | Decoded Second Bit | Decoded Second to Last Bit |
|---|---|---|---|
| 0 | 1000 | 0 | 0 |
| 2 | 1100 | 1 | 0 |
| 4 | 1010 | 0 | 1 |
| 6 | 1110 | 1 | 1 |
| 8 | 1001 | 0 | 0 |
| 10 | 1101 | 1 | 0 |
| 12 | 1011 | 0 | 1 |
| 14 | 1111 | 1 | 1 |

Moreover, the second data bit in the Bluetooth data packet may also be decoded as if two previous bits are known.

In one example, suppose that a sequence of n-bit T=[1, 0, 0, 1, 1, 1, 0, . . . , 1, 0, 0, 1, 0] is transmitted, and a received signal at the output of the frequency discriminator 400, with proper sampling timing recovery, is R=[$r_1$, $r_2$, $r_3$, $r_4$, $r_5$, $r_6$, $r_7$, $r_8$, . . . , $r_{n-3}$, $r_{n-2}$, $r_{n-1}$, $r_n$]. For simplification, in this example, the received signal is also assumed to be not perturbed by either noise or interference.

For the JSD 402 to decode the first data bit, it may need to wait until the receiving of the third symbol, $r_3$. The ED calculator 46-1 of the LUT module 46 may then calculate the Euclidean distance between [$r_1$, $r_2$, $r_3$] and the 8 pre-stored (in tables) shortened received patterns $P_{k_3}$=[$p_0$, $p_1$, $p_2$], where $k_3$=0 to 7. In this example, the first three bits are [1, 0, 0], and thus one corresponding to $k_3$=1 may have the minimum Euclidean distance. Therefore, the decoded first bit is equal to 1 referring to Table 5 stored in the memory 46-2.

Next, when a discriminator output $r_4$ becomes available, which means the second bit is ready to be decoded by the JSD 402, to decode the second bit, the ED calculator 46-1 may calculate the Euclidean distance between [$r_1$, $r_2$, $r_3$, $r_4$] and the 8 pre-stored patterns $P_{k_4}$, where $k_4$=1, 3, 5, 7, 9, 11, 13, 15. For the reason why only the 8 patterns are compared with is that the first bit is already decoded to be "1" in this example. The corresponding transmit 4-bit sequences are listed in Table 6B stored in the memory 46-2. In this example, since the first 4-bit pattern is [1, 0, 0, 1], among the average received patterns, the one corresponding to $k_4$=9 may have the minimum Euclidean distance and thus a decoded second bit can be looked up to be equal to "0".

Next, when the discriminator output $r_5$ is available, the third bit is ready to be decoded. Since the two decoded previous bits are "10," the LUT module 46 may apply Table 4B for decoding the third bit. To decode the third bit, the ED calculator 46-1 may calculate the Euclidean distance between [$r_1$, $r_2$, $r_3$, $r_4$, $r_5$] and the 8 pre-stored patterns $P_{k_5}$, where $k_5$=1, 5, 9, 13, 17, 21, 25, 29. With the first 5-bit pattern being [1, 0, 0, 1, 1], it is average that the one corresponding to $k_5$=25 may have the minimum Euclidean distance and thus the decoded third bit should be equal to "0" by referring to Table 4B stored in the memory 46-2.

Moreover, to decode the fourth bit, the JSD 402 may wait another symbol time for the discriminator output $r_6$ to be available. Since the previous decoded bits are now "00," Table 4A may be used. Again the ED calculator 46-1 may calculate the Euclidean distance between [$r_2$, $r_3$, $r_4$, $r_5$, $r_6$] and the 8 pre-stored patterns $P_{k_5}$, where $k_5$=0, 4, 8, 12, 16, 20, 24, 28. The reason why only computing the Euclidean distance with respect to these 8 patterns is calculated is that the two previously decoded bits are "00". With the transmitted 5-bit pattern being [0, 0, 1, 1, 1], it is expected that the one corresponding to $k_5$=28 may have the minimum Euclidean distance and thus the decoded fourth bit should be "1".

Furthermore, to decode the second-to-last bit, a shortened received discriminator output R=[$r_{n-3}$, $r_{n-2}$, $r_{n-1}$, $r_n$] may be used. Assume that two previous bits, $b_{n-3}$ and $b_{n-2}$, are decoded as "00". The ED calculator 46-1 may calculate the Euclidean distance between [$r_{n-3}$, $r_{n-2}$, $r_{n-1}$, $r_n$] and the 4 pre-stored patterns $P_{k_4}$, where $k_4$=0, 4, 8, 12. With the transmitted 4-bit pattern being [0, 0, 1, 0], the pattern corresponding to $k_4$=4 may have the minimum Euclidean distance and thus the decoded second-to-last bit should be "1" (i.e. the third bit in the transmitted pattern as it has two previous bits and only one next bit).

For decoding the last bit, given two previous bits, "01," two possible transmit patterns $P_{k_2}$ and $P_{k_6}$ in Table 5 may be considered in this example. It is expected that $P_{k_2}$ may have the minimum Euclidean distance and thus the last bit should be decoded as "0".

The sensitivity of a GFSK receiver is dependent on the Signal to Noise Ratio (SNR) requirement. A typical discriminator-based bit-wise decoder may achieve a Bit Error Rate (BER) of $10^{-3}$ with an SNR at 15 dB (for h=0.35) to 17 dB (for h=0.28). A near optimum decoder based on Laurent decomposition and Viterbi decoding may theoretically achieve a BER of $10^{-3}$ with a SNR at 9 (for h=0.35) to 11 dB (for h=0.28). Based on simulation results, either one of the two proposed JSD may achieve a BER of $10^{-3}$ with an SNR around 12 (for h=0.35) to 14 dB (for h=0.28). The implementation loss if patterns for h=0.28 are used for decoding a received waveform with an actual h=0.35, or vice versa, is less than 0.5 dB based on the simulation results. Moreover, the Viterbi decoding may require an accurate h estimate, and hence its performance can be easily degraded for a dirty Bluetooth packet (i.e. including severe frequency offset/drift). In the present invention, an h estimation is not required for the proposed joint-symbol decoder, and receiver sensitivity performance of the proposed joint-symbol decoder may be almost the same between dirty or non-dirty Bluetooth packets.

Moreover, referring again to FIG. 6, a better receiver performance may be achieved by updating (tracking) the "a, d, and c" values during the receiving of a Bluetooth packet. As mentioned above, the average received patterns based on the "a, d, and c" values such as those listed in Table 3 may be pre-calculated, and thus no h-tracking circuits is needed. However, based on simulation results, simple h-tracking may be performed to provide a receiver sensitivity gain up to 0.5 dB. For tracking the "a" value in combination with the proposed GFSK joint symbol decoder using Table 3, let $a_n$ be the "a" value following the decoding of the n-th symbol and $a_0$ being the initial value of "a". An algorithm for tracking the value "a" may be proposed as follows:

A Tracking Algorithm for "a"

Let $a_0$=a, (i.e., the initial value for "a" is a pre-calculated value), then $a_n$ may be updated as follows:

(1) If the pattern with a minimum ED is "101" for an n-th GFSK bit:

$$a_n=(1-\alpha_a)*a_{n-1}-\alpha_a*r_n, \text{ where } 0\leq\alpha_a\leq 1;$$

(2) If the pattern with a minimum ED is "010" for the n-th GFSK bit:

$$a_n=(1-\alpha_a)*a_{n-1}+\alpha_a*r_n, \text{ where } 0\leq\alpha_a\leq 1;$$

(3) Else if no update for $a_n$:

$$a_n=a_{n-1}.$$

Similarly, an exemplary algorithms for tracking the "d" and "c" values, respectively, are shown as follows:

A Tracking Algorithm for "d"

Let $d_0$=d, (i.e. the initial value for "d" is a pre-calculated value), then $d_n$ may be updated as follows:

(1) If the pattern with a minimum ED is "001" or "100" for the n-th GFSK bit:

$$d_n=(1-\alpha_d)*d_{n-1}-\alpha_d*r_n, \text{ where } 0\leq\alpha_d\leq 1;$$

(2) If the pattern with a minimum ED is "110" or "011" for the n-th GFSK bit:

$$d_n=(1-\alpha_d)*d_{n-1}+\alpha_d*r_n, \text{ where } 0\leq\alpha_d\leq 1;$$

(3) Else if no update for $d_n$:

$$d_n=d_{n-1}.$$

A Tracking Algorithm for "c"

Let $c_0=c$, (i.e. the initial value for "c" is a pre-calculated value), then $c_n$ may be updated as follows:

(1) If the pattern with a minimum ED is "000" for the n-th GFSK bit:

$c_n=(1-\alpha_c)*c_{n-1}-\alpha_c*r_n$, where $0 \leq \alpha_c \leq 1$;

(2) If the pattern with a minimum ED is "111" for the n-th GFSK bit:

$c_n=(1-\alpha_c)*c_{n-1}+\alpha_c*r_n$, where $0 \leq \alpha_c \leq 1$;

(3) Else if no update for $c_n$:

$c_n=c_{n-1}$.

Those skilled in the art can easily understand that the abovementioned algorithms can be considered together to form one algorithm for updating the "a, d, and c" values. Moreover, with the updates (tracking) in "a, d, and c" values, respected tables storing average received patterns may be updated at a GFSK symbol rate.

Figure 1:
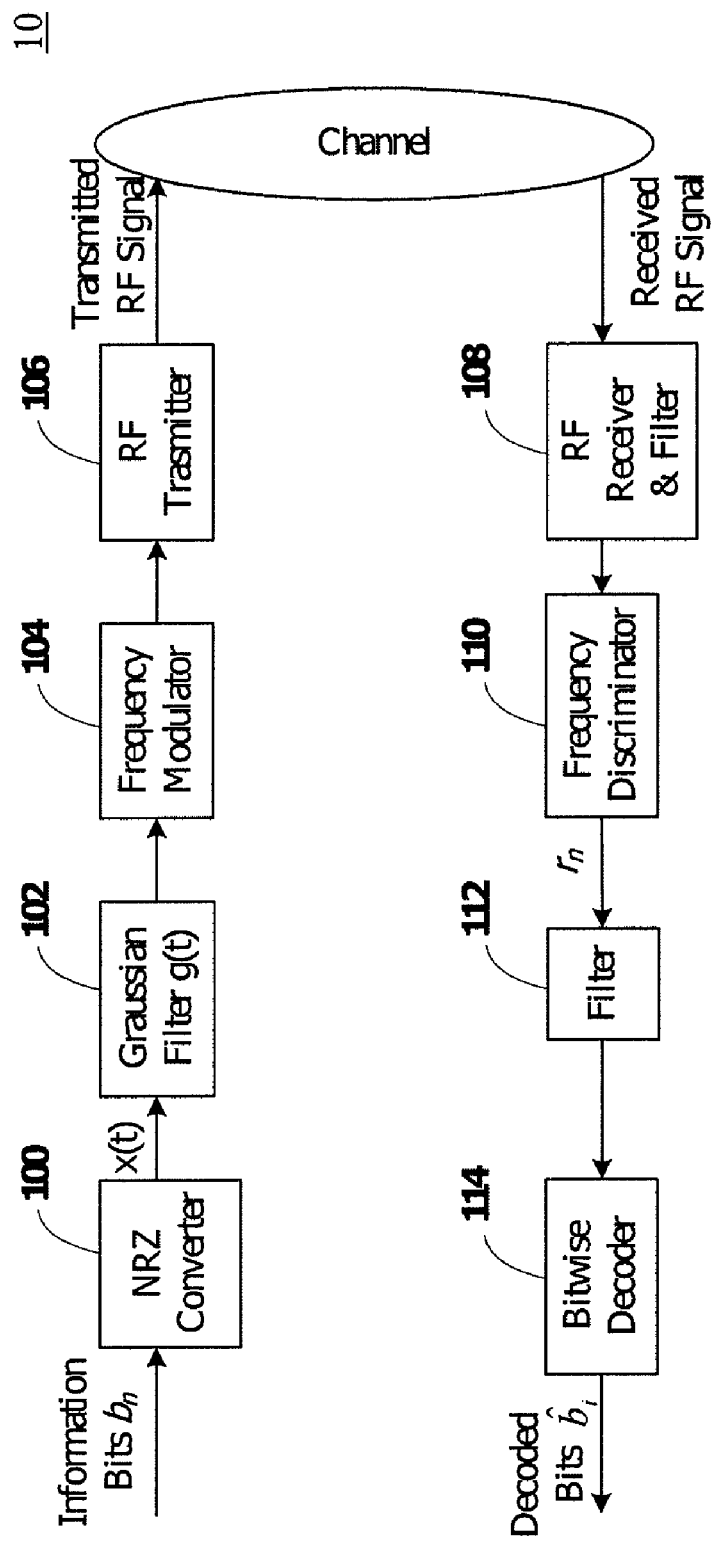
FIG. 1 is a block diagram illustrating a conventional communication system adopting GFSK modulation.
Figure 2A:
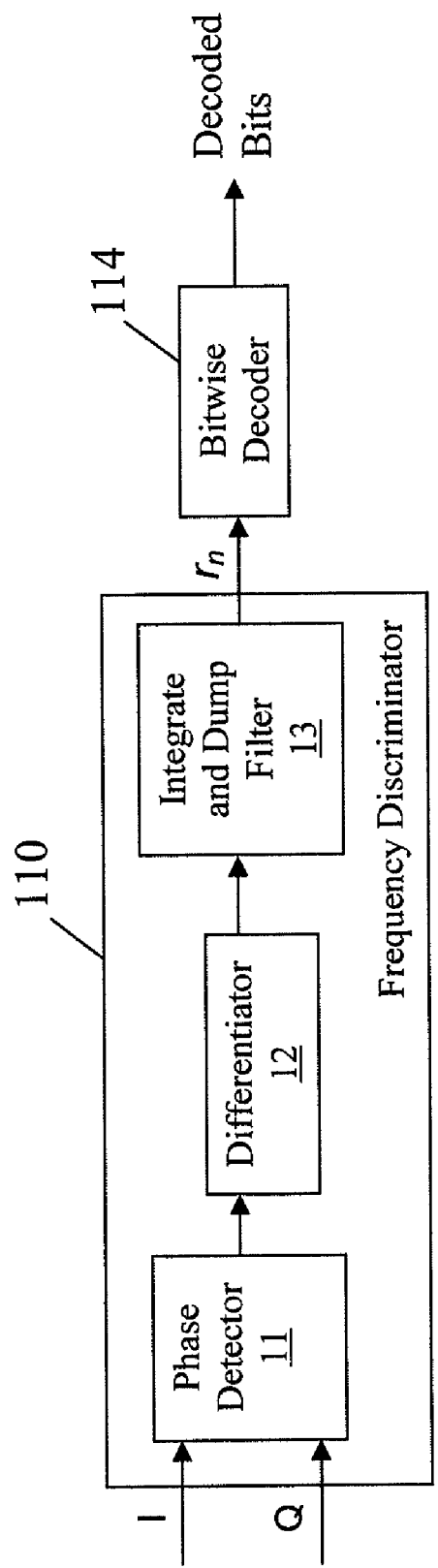
FIG. 2A is a block diagram of a frequency discriminator and a bitwise decoder illustrated in FIG. 1.
Figure 2B:
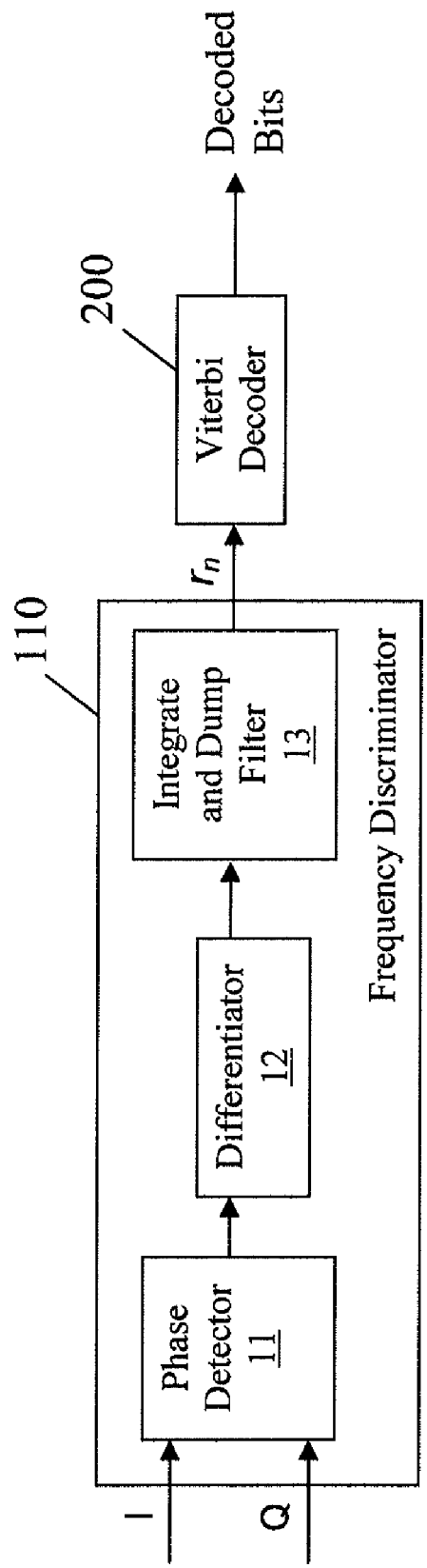
FIG. 2B is a block diagram of a frequency discriminator and a Viterbi decoder in prior art.

It will be appreciated by those skilled in the art that while designing a receiver for wireless communications, trade-off between complexity and sensitivity enhancement of the receiver may become critical for designing a competitive product. For example, in order to provide longer battery life, it may be desired for a Bluetooth device to provide decent receiver sensitivity with lower power consumption. In the present invention, two joint symbol decoder examples have been delineated in the above, each considering a total of 8 truncated patterns during 3 GFSK bit (symbol) period, to provide about 2 dB gain in required receive signal to noise ratio (SNR), when compared to a traditional discriminator based bitwise decoder such as those described or illustrated with reference to FIG. 2B. In our illustrations, one of the two joint symbol decoders may be a decision-feedback-based joint-symbol decoder. In this case, an erroneous decision on a previous symbol may affect the decoding of the current symbol.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A receiver capable of decoding a symbol based on information on a previous symbol, the symbol and a next symbol in a Gaussian frequency shift keying (GFSK) communication system, the receiver comprising:

a discriminator to generate a symbol for each bit in a bit sequence;

a first lookup table (LUT) to store a number of bit patterns and mapping patterns, wherein each of the bit patterns is in the form of a set of consecutive bits in the bit sequence and corresponds to a respective one of the mapping patterns, and wherein each of the mapping patterns includes a set of entries and each of the entries results from an operation of attribute values at a sample time in the waveform of a symbol;

a calculator to receive a set of consecutive symbols from the discriminator and calculate a distance value between the set of consecutive symbols and each of the mapping patterns; and a comparator to identify one of the mapping patterns with a minimum distance value by comparing among the distance values from the calculator.

2. The receiver of claim 1, wherein the first LUT stores a number of pattern indexes each corresponding to a respective one of the bit patterns.

3. The receiver of claim 2, wherein the first LUT outputs one of the bit patterns corresponding to the pattern index that in turn corresponds to one of the mapping patterns.

4. The receiver of claim 3 further comprising a memory module to output a middle bit of the one of the bit patterns in response to the pattern index.

5. The receiver of claim 1, wherein the attribute values include values "a", "d" and "c":

$$a = \frac{h}{4T_s}(f_4 - 2f_0),$$

$$d = \frac{hf_4}{2T_s},$$

and $$c = \frac{h}{2T_s}(f_4 + 2f_0),$$

where h represents a modulation index, $T_s$ represents a symbol time, $f_4$ represents a sampling point where the impulse response of a symbol is exactly sampled, and $f_0$ represents a sampling point where the impulse response of a symbol is the weakest.

6. The receiver of claim 1, wherein the calculator is configured to calculate the Euclidean distance between the set of consecutive symbols and each of the mapping patterns.

7. The receiver of claim 1, wherein each of the bit patterns includes a set of "n" consecutive bits, n being one of 3, 5 and 7.

8. The receiver of claim 1 further comprising a second LUT to store a number of bit patterns, wherein each of the bit patterns includes a set of consecutive bits with the leading two bits predetermined.

9. The receiver of claim 8, wherein the second LUT stores a number of pattern indexes each corresponding to a respective one of the bit patterns in the second LUT.

10. The receiver of claim 1 further comprising a third LUT to store a number of bit patterns for decoding the first bit and the last bit in the bit sequence, wherein each of the bit patterns includes a set of three consecutive bits.

11. The receiver of claim 1 further comprising a fourth LUT to store a number of bit patterns for decoding the second bit and the second to last bit in the bit sequence, wherein each of the bit patterns includes a set of four consecutive bits.

12. A receiver capable of decoding a symbol based on information on a previous symbol, the symbol and a next symbol in a Gaussian frequency shift keying (GFSK) communication system, the receiver comprising:
- a discriminator to generate a symbol for each bit in a bit sequence;
- a first lookup table (LUT) to store a number of bit patterns and mapping patterns, wherein each of the bit patterns is in the form of a set of (2n+1) consecutive bits with the leading "n" bits of each of the bit patterns being predetermined, and corresponds to a respective one of the mapping patterns, "n" being an integer equal to or greater than 2, and wherein each of the mapping patterns includes a set of entries and each of the entries results from an operation of attribute values at a sample time in the waveform of a symbol;
- a calculator to receive a set of consecutive symbols from the discriminator and calculate a distance value between the set of consecutive symbols and each of the mapping patterns; and
- a comparator to identify one of the mapping patterns with a minimum distance value by comparing among the distance values from the calculator.

13. The receiver of claim 12, wherein the first LUT stores a number of pattern indexes each corresponding to a respective one of the bit patterns.

14. The receiver of claim 13, wherein the first LUT outputs one of the bit patterns corresponding to the pattern index that in turn corresponds to one of the mapping patterns.

15. The receiver of claim 14 further comprising a memory module to output a middle bit of the one of the bit patterns in response to the pattern index.

16. The receiver of claim 12, wherein the attribute values include values "a", "d" and "c":

$$a = \frac{h}{4T_s}(f_4 - 2f_0),$$

$$d = \frac{hf_4}{2T_s},$$

and $$c = \frac{h}{2T_s}(f_4 + 2f_0),$$

where h represents a modulation index, $T_s$ represents a symbol time, $f_4$ represents a sampling point where the impulse response of a symbol is exactly sampled, and $f_0$ represents a sampling point where the impulse response of a symbol is the weakest.

17. The receiver of claim 12, wherein the calculator is configured to calculate the Euclidean distance between the set of consecutive symbols and each of the mapping patterns.

18. The receiver of claim 12 further comprising a second LUT to store a number of bit patterns for decoding the first bit and the last bit in the bit sequence, wherein each of the bit patterns includes a set of three consecutive bits.

19. The receiver of claim 12 further comprising a third LUT to store a number of bit patterns for decoding the second bit and the second to last bit in the bit sequence, wherein each of the bit patterns includes a set of four consecutive bits.

* * * * *

UNITED STATES PATENT AND TRADEMARK OFFICE
CERTIFICATE OF CORRECTION

PATENT NO. : 8,259,862 B2
APPLICATION NO. : 12/637388
DATED : September 4, 2012
INVENTOR(S) : Peng et al.

It is certified that error appears in the above-identified patent and that said Letters Patent is hereby corrected as shown below:

Column 4,
Line 5, "additive Gaussian noise" should read --additive i.i.d. Gaussian noise--.

Signed and Sealed this
Twenty-sixth Day of February, 2013

Teresa Stanek Rea
*Acting Director of the United States Patent and Trademark Office*